(12) United States Patent
Stark et al.

(10) Patent No.: US 7,905,468 B2
(45) Date of Patent: Mar. 15, 2011

(54) LIGHTWEIGHT VALVE

(75) Inventors: Holger Stark, Allmersbach (DE); Martin Schlegl, Rudersberg (DE)

(73) Assignee: Daimler AG, Stuttgart (DE)

( * ) Notice: Subject to any disclaimer, the term of this patent is extended or adjusted under 35 U.S.C. 154(b) by 970 days.

(21) Appl. No.: 10/579,885

(22) PCT Filed: Nov. 6, 2004

(86) PCT No.: PCT/EP2004/012578
§ 371 (c)(1), (2), (4) Date: May 18, 2006

(87) PCT Pub. No.: WO2005/049977
PCT Pub. Date: Jun. 2, 2005

(65) Prior Publication Data
US 2007/0145322 A1    Jun. 28, 2007

(30) Foreign Application Priority Data

Nov. 19, 2003  (DE) .................................. 103 54 077

(51) Int. Cl.
*B22D 41/16*  (2006.01)

(52) U.S. Cl. ........................ 251/356; 123/188.3

(58) Field of Classification Search ............... 123/188.2, 123/189.7, 190.14, 188.4, 188.3; 251/356, 251/360, 368, 375
See application file for complete search history.

(56) References Cited

U.S. PATENT DOCUMENTS

| | | | |
|---|---|---|---|
| 1,506,900 A | 9/1924 | Greiner et al. | |
| 1,552,760 A * | 9/1925 | Rothenbucher | 137/332 |
| 1,552,761 A * | 9/1925 | Rothenbucher | 137/332 |
| 1,727,621 A * | 9/1929 | Taub | 123/188.1 |
| 2,111,549 A * | 3/1938 | Blanchet | 123/188.7 |
| 2,371,548 A | 3/1945 | Saffady | 123/177 |
| 2,407,561 A | 9/1946 | Lincoln | 123/188.3 |
| 2,439,240 A * | 4/1948 | Cummings | 123/188.3 |
| 3,156,259 A * | 11/1964 | Havelka et al. | 137/516.23 |
| 3,395,747 A | 8/1968 | Thompson | 164/95 |
| 3,503,375 A | 3/1970 | Thompson | 123/188.3 |
| 3,911,875 A | 10/1975 | Ysberg | 123/41.34 |
| 4,137,886 A * | 2/1979 | Hiramatsu | 123/188.11 |
| 4,428,336 A * | 1/1984 | Dye et al. | 123/188.7 |
| 4,513,701 A | 4/1985 | Sternberg et al. | 123/188.3 |

(Continued)

FOREIGN PATENT DOCUMENTS

AT  005 131 U1  3/2002

(Continued)

OTHER PUBLICATIONS

DE1971382 Translation, an EPO automated translation of DE19731382.*

(Continued)

*Primary Examiner* — John Rivell
*Assistant Examiner* — Kevin Murphy
(74) *Attorney, Agent, or Firm* — Davidson, Davidson & Kappel, LLC

(57) ABSTRACT

A lightweight valve (1), in particular for internal combustion engines, and a method for manufacturing the lightweight valve (1) are provided. The valve comprises a valve stem (3), a hollow valve cone (7) and a valve disk (13), the valve cone (7) and the valve disk (13) together forming a hollow space. The valve disk (13) is provided with a gripping receiver (23) for the valve stem (3).

11 Claims, 2 Drawing Sheets

U.S. PATENT DOCUMENTS

| | | | | |
|---|---|---|---|---|
| 4,744,340 | A | * | 5/1988 | Kirby .................. 123/188.7 |
| 5,044,604 | A | * | 9/1991 | Topham et al. .............. 251/120 |
| 5,054,195 | A | | 10/1991 | Keck et al. .............. 29/888.453 |
| 5,345,965 | A | * | 9/1994 | Blume .................. 137/533.25 |
| 5,458,314 | A | | 10/1995 | Bonesteel .................. 251/337 |
| 5,823,158 | A | | 10/1998 | Heimann et al. .......... 123/188.3 |
| 6,009,843 | A | | 1/2000 | Griffin et al. .............. 123/188.3 |
| 6,263,849 | B1 | | 7/2001 | Bonesteel et al. ......... 123/90.51 |
| 6,354,258 | B1 | | 3/2002 | Abele et al. .............. 123/188.3 |
| 6,935,296 | B2 | | 8/2005 | Abele et al. .............. 123/188.3 |
| 6,938,602 | B2 | | 9/2005 | Hora et al. ................ 123/188.3 |
| 2007/0125976 | A1 | | 6/2007 | Stark et al. .................. 251/120 |
| 2007/0145322 | A1 | | 6/2007 | Stark et al. .................. 251/356 |
| 2008/0272325 | A1 | | 11/2008 | Schlegl et al. .............. 251/120 |

FOREIGN PATENT DOCUMENTS

| | | |
|---|---|---|
| DE | 32 33 392 | 3/1984 |
| DE | 36 25 590 | 2/1988 |
| DE | 197 31 382 | 1/1999 |
| DE | 198 04 053 | 8/1999 |
| DE | 100 29 299 C | 3/2003 |
| DE | 102 04 122 C | 5/2003 |
| DE | 101 60 942 | 6/2003 |
| DE | 102 57 505 | 7/2003 |
| EP | 0 296 619 | 12/1988 |
| EP | 709 552 | 5/1996 |
| EP | 1 359 292 | 11/2003 |
| FR | 2 071 137 | 9/1971 |
| FR | 2 540 176 | 8/1984 |
| GB | 476089 | 12/1937 |
| GB | 1 405 606 | 9/1975 |
| GB | 2 137 279 | 10/1984 |
| JP | 58-142204 | 10/1981 |
| JP | 8-210112 A | 9/1992 |
| JP | 4-269312 A | 8/1996 |
| JP | 2000-045730 | 2/2000 |
| WO | WO 98/36159 | 8/1998 |
| WO | WO 9905397 | 2/1999 |

OTHER PUBLICATIONS

Statement of Relevance for AT 005 131 U1.

* cited by examiner

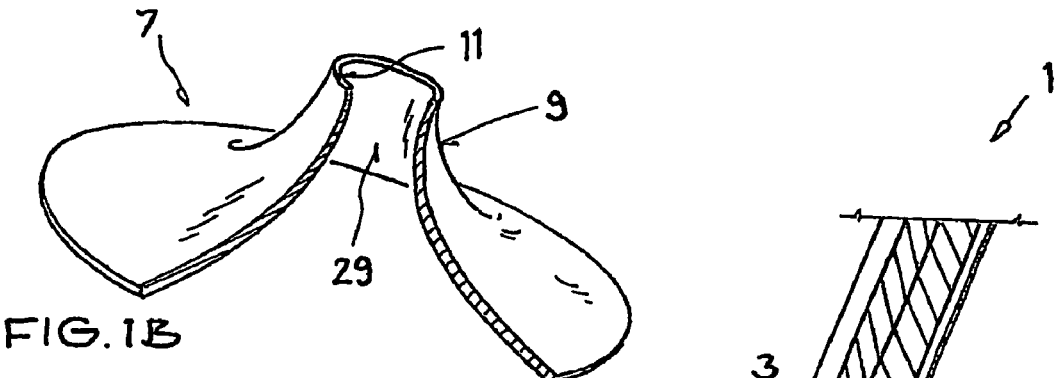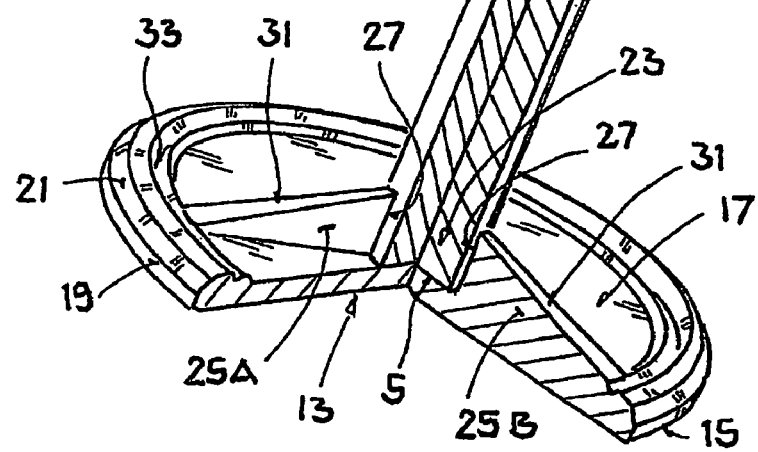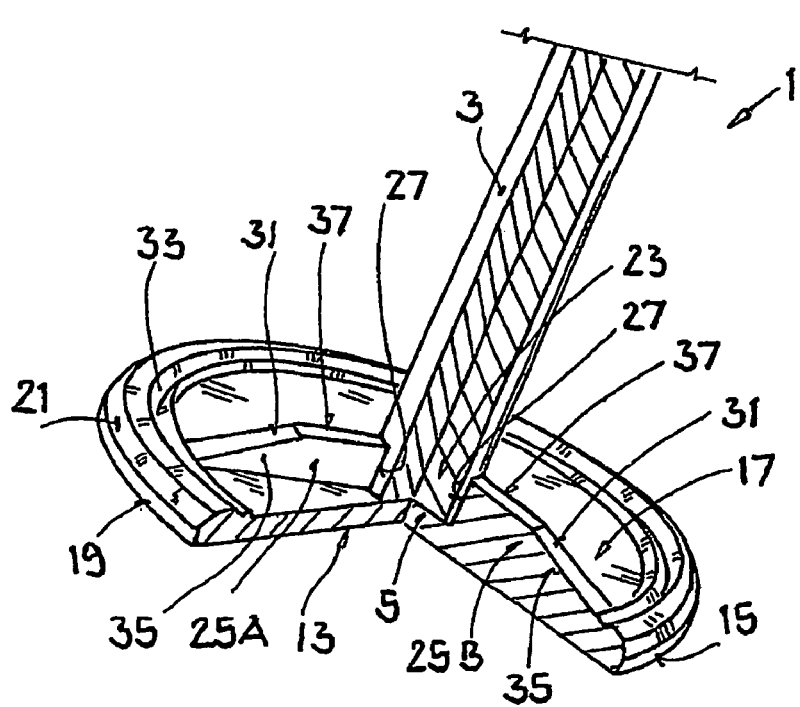

LIGHTWEIGHT VALVE

The invention relates to a lightweight valve, in particular for internal combustion engines, comprising a valve stem, a hollow valve cone and a valve disk, the valve cone and the valve disk together forming a hollow space, and to a method for manufacturing the lightweight valve.

BACKGROUND

Lightweight valves of the kind referred to here are known (DE 198 04 053 A1). They are used inter alia as inlet and outlet valves for internal combustion engines and comprise a solid or hollow valve stem, a funnel/trumpet-shaped valve cone and a valve disk. For the purpose of weight reduction, the valve cone is hollow and therefore has only a small wall thickness. The valve cone is designed either in one piece with the valve stem or the valve disk or as a separate component which is welded to the valve stem and the valve disk.

As the valve disk is not supported on a large area owing to the hollow space in the valve cone and the valve cone moreover has only a small wall thickness, the valve disk may be deformed during operation by the combustion pressure in the combustion chamber of the internal combustion engine, which contributes to premature wear of the lightweight valve. Furthermore, the thin-walled valve cone may also be deformed. In order to prevent this, DE 198 04 053 A1 proposes making the valve stem so long that it bears with its end face against the valve disk on the flat side thereof facing away from the combustion chamber, by virtue of which the disk is supported. In this connection, the valve stem and the valve disk can be welded together in their contact region. In other embodiments, the valve disk is supported against the valve stem by means of an intermediate piece designed in one piece on the valve cone or a separate sleeve, fixed between valve stem and valve disk.

It is a disadvantage of the known lightweight valve that accurate relative alignment of the individual parts, in particular the valve stem and the valve disk, before the joining process can be brought about only with high outlay. While it is true that one illustrative embodiment (FIG. 3) of the known lightweight valve provides centering on the valve disk for the valve stem, slanting of the valve stem in relation to the valve disk while they are being welded together nevertheless cannot be excluded without accurate holding of valve stem and disk by means of appropriate devices.

SUMMARY OF THE INVENTION

It is an object of the invention to provide a lightweight valve of the kind referred to in the introduction which does not have this disadvantage.

The present invention provides a lightweight valve with valve disk having a gripping receiver for the valve stem. This serves for non-positive connection between valve disk and valve stem, so that they are interconnected immovably. This design simplifies the handling of this subassembly formed by insertion of the valve stem end into the valve disk gripping receiver during the subsequent joining process, that is when valve disk and stem are materially interconnected, preferably welded or soldered together. Further fastening means for connecting the valve disk and the valve stem for the purpose of preassembly are not required. The gripping receiver can moreover be designed in such a way that a desired alignment of the valve stem relative to the valve disk takes place when the valve stem end is inserted into the gripping receiver, so that separate centering means can be dispensed with.

Owing to the connection of the valve disk and the valve stem in the central region of the valve disk by means of the gripping receiver, optimum introduction of the gas forces acting on the valve disk during operation of the lightweight valve into the valve stem can furthermore be ensured without inadmissibly great deformations of the valve disk and of the preferably very thin-walled valve cone arising in this connection. It is therefore readily possible for the valve cone to be virtually force-free during operation of the lightweight valve, that is for only very small forces, if any, to be introduced into the valve cone via the valve disk. The valve cone can therefore be designed with very thin walls, which is advantageous in manufacture of the same and moreover contributes to reducing the weight of the lightweight valve.

In an advantageous illustrative embodiment, the valve disk with the gripping receiver provided thereon is made from the intermetallic phase titanium aluminide (TiAl) or a TiAl alloy by casting. This valve disk is of only light weight and is moreover extremely wear-resistant. According to another variant embodiment, the valve disk and the gripping receiver are made of steel, in particular tool steel, and are produced by forging. According to a third variant embodiment, the valve disk and the gripping receiver designed in one piece with the valve disk are manufactured by means of a powder metallurgy production process, in particular from a tool steel which is extremely wear-resistant. It is common to all the variant embodiments mentioned above that the gripping receiver is designed in one piece with the valve disk and can therefore be manufactured cost-effectively.

As far as the materials which can be used for the valve stem and the valve disk with the gripping receiver provided thereon are concerned, reference is also made to DE 100 29 299 C2, the content of which with regard to the materials used is a subject of this description.

In an especially preferred illustrative embodiment of the lightweight valve, the valve cone is designed as a sheet metal component. High-carbon structural steel, in particular St-52, or low-alloy steel, in particular X10Cr13, for example, is used as the material. The valve cone can be produced cost-effectively by deep-drawing.

An illustrative embodiment of the lightweight valve in which the gripping receiver is formed by means of a number of reinforcing ribs designed in one piece on the valve disk is also preferred. For its grip-fixing to the valve disk, the valve stem is introduced into a free space delimited by the reinforcing ribs, the width or diameter of which is the same as or smaller than the outside diameter of the valve stem end inserted into the free space. A further function of the reinforcing ribs consists in preventing inadmissibly great deformation of the essentially disk-shaped valve disk which preferably has only a small thickness.

The method according to the present invention provides for a first one-piece component forming the valve disk and the gripping receiver is produced by casting, forming and/or by means of a powder metallurgy method in a first step. A second one-piece component forming the valve stem is produced in a second step. In this connection, the valve stem can be of hollow design or consist of solid material. In a third step, a third component forming the valve cone is produced, preferably by means of a forming operation. In a fourth step, the first and second components are then fitted together. In the process, the valve stem engages in the valve disk gripping receiver, by virtue of which the components are centered in relation to one another and at the same time interconnected securely. Valve disk and valve stem are subsequently interconnected inseparably by means of a material connection. Finally, the hollow valve cone is pushed onto the valve stem and brought to lie with its end of greater diameter opposite the valve disk. The through-opening in the valve cone preferably has a guiding and centering portion, so that accurate alignment of the valve cone relative to the valve stem and the valve disk takes place when the valve stem is pushed through. Finally, the valve cone is connected inseparably to both the valve stem and the valve disk by means of a material connection. Owing to the design according to the invention of the lightweight valve, relative alignment/centering of the individual components is possible in a simple way without special aligning devices being essential for this.

BRIEF DESCRIPTION OF THE DRAWINGS

The invention is explained in greater detail below with reference to the drawing, in which:

FIG. 1A shows a detail of an illustrative embodiment of a lightweight valve for internal combustion engines in a perspective, cutaway illustration.

FIG. 1B shows a perspective view of an illustrative embodiment of a valve cone for the lightweight valves shown in FIGS. 1A to 4, and FIGS. 2 to 4 each show a detail of a further illustrative embodiment of the lightweight valve.

DETAILED DESCRIPTION

Figure 3:
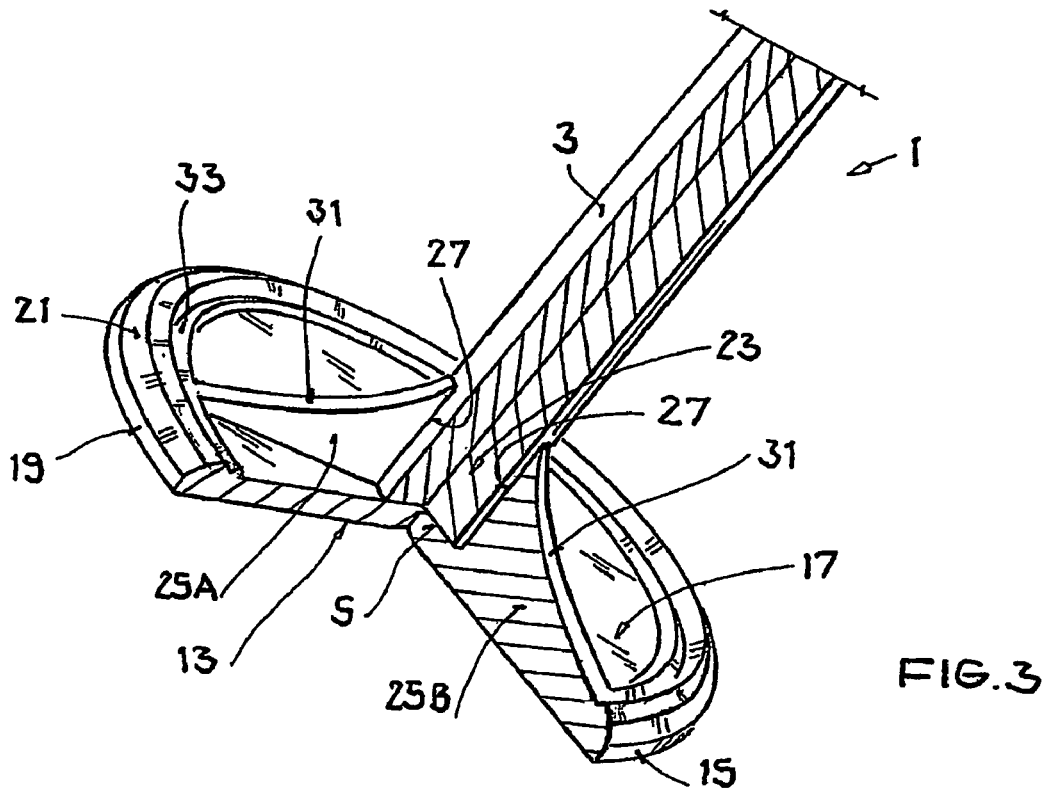

FIG. 1A shows part of a first illustrative embodiment of a lightweight valve 1 of multi-part design for internal combustion engines. This can be used as a thermally less loaded inlet valve or as a thermally more highly loaded outlet valve, the material of the individual parts being selected accordingly depending on the use of the lightweight valve 1.

The lightweight valve 1 comprises a valve stem 3 which here consists of solid material and has a constant, circular cross section at least over part of its length. Alternatively, for reasons of weight reduction, the valve stem 3 can also have a hollow space. The valve stem 3 can, for example, be formed by a precision-drawn tube made of steel, for example X45, and is closed at its end which is not illustrated by means of a valve stem endpiece/foot. The valve stem 3 has at its end, as can be seen in FIG. 1A, a plane end face 5.

The lightweight valve 1 also comprises a hollow valve cone 7 illustrated in FIG. 1B which is designed as a separate sheet-metal part and has only a small wall thickness. The one-piece valve cone 7 has a basic body in the shape of a disk spring, on the end of smaller diameter of which a collar-shaped guiding and centering portion 9 is formed, which is perforated by a through-opening 11, through which the valve stem 3 extends in the joined-together state. The diameter of the through-opening 11 is the same as or greater than the outside diameter of the valve stem 3, so that either the latter extends through the through-opening 11 with play or a non-positive connection is formed between valve stem 3 and valve cone 7. When the valve cone 7 is pushed onto the valve stem 3, these parts are automatically aligned/centered in relation to one another owing to the guiding and centering portion 9.

The lightweight valve 1 also has a valve disk 13 which is provided on its flat side facing the valve stem 3 with a stepped recess 17 of all-round design which is arranged at a radial distance from the valve disk peripheral surface 15 and into which the valve cone 7 projects with its end of greater diameter. In this connection, the recess 17 is designed in such a way that a continuous transition can be brought about between the valve disk 13 and the valve cone 7 in their connection region. The hollow space of the valve cone 7 is closed by means of the valve disk 13.

The valve disk 13 is of disk-shaped design and has a first, cylindrical longitudinal portion 19 of constant cross section and, adjoining this, a conical, that is frustoconical, second longitudinal portion 21, the cone angle of the second longitudinal portion 21 being the same as the cone angle of the valve cone 7 at its end of greater diameter, by virtue of which a continuous transition can be brought about in the connection region between these parts. The lateral surface of the longitudinal portion 21 usually forms the sealing surface of the lightweight valve 1.

The valve disk 13 has on its flat side facing the valve cone 7 or the valve stem 3 a gripping receiver 23 for centering and grip-fixing of the valve stem 3. The gripping receiver 23 is located in the center of the valve disk 13.

In this illustrative embodiment, the gripping receiver 23 is formed, for example, by three reinforcing ribs 25 molded into the valve disk 13 and arranged in the recess 17, of which only the reinforcing ribs 25A and 25B can be seen in the illustration according to FIG. 1A. Seen in a top view of that flat side of the valve disk 13 facing the valve stem 3, the reinforcing ribs 25 extend radially in relation to the longitudinal central axis of the valve disk 13 extending in alignment with the longitudinal central axis of the valve stem 3 and are arranged at a spacing of 120° from one another. The reinforcing ribs 25 extend only to close to the valve disk center, so that a free space forming the gripping receiver 23 is formed between the reinforcing ribs 25 in the region of the valve disk center. In this connection, that end face 27 of the reinforcing ribs 25 facing the valve disk center in each case forms a wall portion of the gripping receiver 23.

The diameter of the gripping receiver 23, that is of the free space delimited between the end sides of the reinforcing ribs 25, is the same as or slightly smaller than the outside diameter of the valve stem 3, so that the latter can with its free end be introduced into the gripping receiver 23 with an accurate fit and be held non-positively therein. In the properly joined-together state, the end face 5 of the valve stem 3 bears flat against the bottom of the recess 17, as illustrated in FIG. 1A.

As can be seen from FIG. 1A, the reinforcing ribs 25 are designed as rectilinear strips of which the height increases in the direction toward the valve disk center while the width decreases in the direction toward the gripping receiver 23. The reinforcing ribs 25 are designed to complement the inner wall 29 of the valve cone 7 at least in sections, so that the latter, in the joined-together state of the lightweight valve 1, rests flat with its inner wall 29 on the upper narrow side 31 of the reinforcing ribs 25 and is consequently supported by these.

The valve disk 13 and the valve stem 3 are interconnected inseparably by means of a material connection. This can take place, for example, by means of friction welding during insertion of the valve stem into the gripping receiver 23. During joining by means of friction welding, the "gripping" function of the gripping receiver is not used but only its second function of "centering" the valve stem in relation to the valve disk. Additionally or alternatively, the valve stem 3 can be welded to the valve disk 13 on its end face 5. In the illustrative embodiment shown in FIG. 1A, soldering together is also suitable as the joining method for connecting the valve stem 3 to the valve disk 13.

Before or after the material connection of valve stem 3 and valve disk 13, the valve cone 7 is pushed onto the valve stem 3, in particular until its region of greater diameter engages in the recess 17 which has in its edge region an edge step 33 for supporting or as a bearing shoulder for the valve cone 7. The valve cone 7 is welded together with the valve stem 3 in the region of the guiding and centering portion 9 and with the valve disk 13 in the connection region lying in the region of the recess 17, in particular preferably by means of a friction, beam or fusion welding procedure.

It remains to state that the valve cone 7 has a reduced wall thickness in the region of its guiding and centering portion 9, so that it as it were nestles against the outside of the valve stem. By virtue of this, a transition between valve cone and valve stem is brought about which has only a small step. In order to create a continuous transition between valve cone and valve stem, the valve stem 3 can have a corresponding taper in the form of a diameter jump on its outside in the region of its free end.

The lightweight valve 1 described with reference to FIGS. 1A and 1B is characterized in particular in that its individual parts can be interconnected or prefixed in a simple way by fitting together and in that in this connection alignment/centering of the individual parts in relation to one another takes place owing to their constructional design.

The gas forces acting on the valve disk 13 during operation of the lightweight valve 1 are advantageously supported via the valve stem 3 bearing centrally against the valve disk 13. In this connection, it can be ensured that the gas forces acting on the valve disk 13 cannot, or can only to a harmless extent, be introduced into the very thin-walled valve cone 7. Deformation of the valve cone 7 can therefore reliably be excluded.

FIG. 2 shows a detail of a second illustrative embodiment of the lightweight valve 1. The same parts are provided with the same reference numbers, so that in this respect reference is made to the description for FIGS. 1A and 1B. The lightweight valve 1 differs from that described previously only in that the reinforcing ribs 25 in each case have an external first portion 35 which rises linearly in the direction toward the valve disk center and a second portion 37 adjoining the first portion, the second portion 37 having a constant height. Owing to this design, the bearing area of the valve cone 7 on the upper narrow side 31, which here has a stepped shape, is reduced. The bearing contact surfaces between valve cone and reinforcing ribs are located at a radial distance from the disk center.

FIG. 3 shows a detail of a third illustrative embodiment of the lightweight valve 1. The same parts are provided with the same reference numbers, so that in this respect reference is made to the description of the preceding FIGS. 1A to 2. Here, the reinforcing ribs 25 have a narrow side 31 which extends so as to complement exactly the inner wall 29 of the trumpet/funnel-shaped valve cone 7, so that, in the joined-together state, the inner wall 29 bears against the narrow side 31 of the reinforcing ribs 25 over virtually their entire length, by virtue of which the support and centering of the valve cone 7 is improved.

Figure 4:
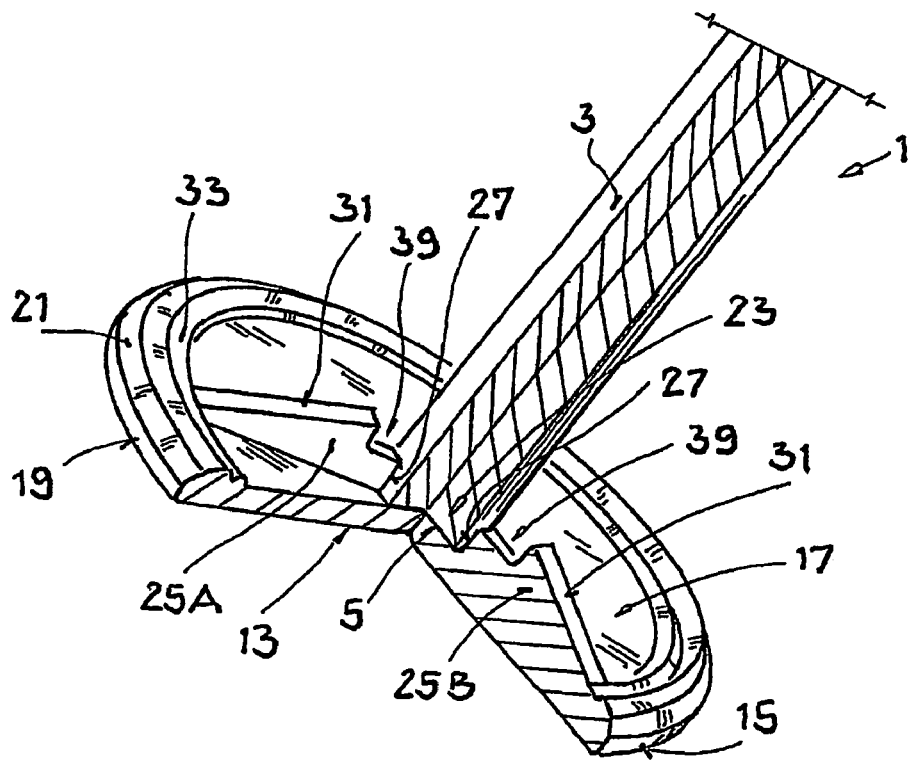

FIG. 4 shows a detail of a fourth illustrative embodiment of the lightweight valve 1. Parts which have already been described with reference to the preceding figures are provided with the same reference numbers, so that in this respect reference is made to the description for FIGS. 1A to 3. Here, the reinforcing ribs 25 are in the region of the gripping receiver 23 in each case provided with a cutout 39 which reduces the height of the end face 27, by virtue of which the contact area between the valve stem 3 and the reinforcing ribs 25 is reduced. This can be advantageous in the case of very rigid components in order to reduce the expenditure of force during insertion of the valve stem 3 into the gripping receiver 23.

It is common to the illustrative embodiments of the lightweight valve 1 described with reference to FIGS. 1A to 4 that, owing to the support of the valve disk 9 by the valve stem 3 and the reinforcing ribs 25, only a very small deformation, if any, of the valve disk 13 arises on account of the gas forces acting on it during operation. It can therefore be ensured that the gas forces acting on the valve disk are introduced essentially completely into the valve stem 3 and the connection between valve disk 13 and valve cone 7 is designed in such a way that only very small forces, if any, are introduced into the valve cone 7 from the valve disk 13.

It remains to state that the valve stem 3 and the valve disk 13 can be made from the same material or from different materials. The connection between valve disk 13 and valve stem 3 can in particular be effected by means of friction welding, beam welding, fusion welding or capacitor discharge welding in all the illustrative embodiments described with reference to FIGS. 1A to 4 as well. Connecting the valve disk 13 and the extremely thin-walled valve cone 7 is preferably effected by means of beam, fusion or laser welding.

It is common to all the variant embodiments of the lightweight valve 1 that the width of the reinforcing ribs 25 can also decrease in the direction of the valve disk center or is constant over the entire length of the reinforcing ribs 25. In addition, the valve cone 7 can also be welded to the reinforcing ribs 25, which further increases the stability of the lightweight valve 1.

It is also common to all the variant embodiments of the lightweight valve 1 that the gripping receiver 23 is designed in such a way that tilting of the valve stem 3 inserted into it and held there by means of a grip fit can be excluded. Therefore, the higher the end faces 27 of the reinforcing ribs 25, the better the lateral guidance/support of the valve stem 3 and the greater the security against skewing of the valve stem 3 in relation to the valve disk 13 after introduction of the stem end into the gripping receiver 23.

The valve disk 13 with the reinforcing ribs 25 designed in one piece thereon can be manufactured cost-effectively by forging owing to its simple geometry.

In summary, it remains to state that the lightweight valve 1 according to the invention is characterized in particular in that, in addition to only a small weight, it has only a few individual components, which can be interconnected with a few simple joining operations, so that it can be produced cost-effectively.

What is claimed is:

1. A lightweight combustion engine valve comprising:
a metallic valve stem including a valve stem end face;
a hollow valve cone having a region of greater diameter; and
a metallic valve disk, the valve cone and the valve disk together forming a hollow space, the valve disk having a flat side facing the hollow space supporting a gripping receiver, the gripping receiver gripping an end portion of the valve stem and the valve stem end face resting against the flat side, the valve disk having a recess defined therein that has an edge region including an edge step for supporting the valve cone;
wherein the gripping receiver is formed by reinforcing ribs on the valve disk, each of the reinforcing ribs including an end face facing a center of the valve disk center and an upper face supporting an inner wall of the valve cone, each end face forming a separate wall portion, the wall portions together gripping an outer circumference of the valve stem, the region of greater diameter of the valve cone engaging in the recess of the valve disk, the valve cone being welded together with the valve stem and being welded together with the valve disk in the recess;
wherein a height of each of the reinforcing ribs increases in a direction toward a center of the valve disk and a width of each of the reinforcing ribs decreases in the direction toward the center of the valve disk.

2. The lightweight valve as claimed in claim 1 wherein the plurality of reinforcing ribs are three reinforcing ribs arranged at a spacing of 120° from one another.

3. The lightweight valve as claimed in claim 1 wherein the reinforcing ribs are rectilinear strips.

4. The lightweight valve as claimed in claim 1 wherein the height of the reinforcing ribs rises linearly from a radially external end in the direction of the center of the valve disk.

5. The lightweight valve as claimed in claim 1 wherein a linearly rising first portion of the reinforcing ribs is adjoined by a second reinforcing rib portion of constant height.

6. The lightweight valve as claimed in claim 1 wherein a linearly rising first portion of the reinforcing ribs is adjoined by a second reinforcing rib portion extending so as to complement an inner wall of the hollow valve cone.

7. The lightweight valve as claimed in claim 1 wherein the reinforcing ribs are, in a region of the gripping receiver provided with a cutout reducing a size of the reinforcing rib end faces.

8. The lightweight valve as claimed in claim 1 wherein an upper narrow side of the reinforcing ribs bears against an inner wall of the hollow valve cone at least in sections.

9. The lightweight valve as claimed in claim 1 wherein the reinforcing ribs and the valve cone are interconnected by a material connection.

10. The lightweight valve recited in claim 1 wherein an end of the end portion of the valve stem contacts a top side of the valve disk.

11. The lightweight valve recited in claim 1 wherein the reinforcing ribs have a narrow side which extends so as to complement an inner wall of the valve cone so that the valve disk and the valve cone are connected with the inner wall bearing against the narrow side of the reinforcing ribs or parts thereof.

* * * * *